O. H. WATKINS.
HAY SHOCKER.
APPLICATION FILED JULY 3, 1911.
1,039,230.
Patented Sept. 24, 1912.
3 SHEETS—SHEET 3.
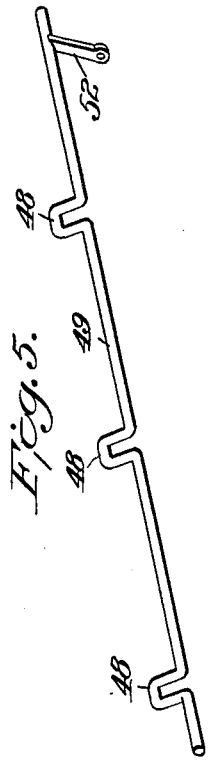
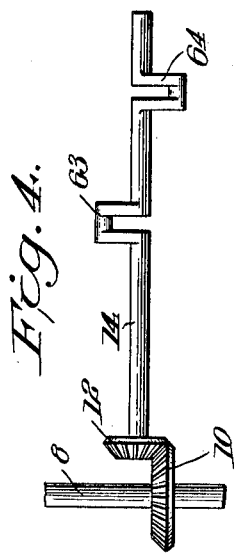
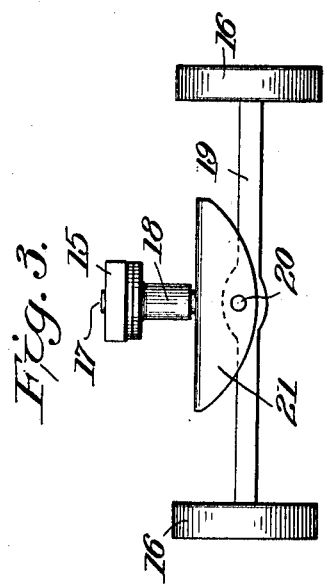
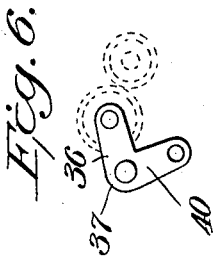
WITNESSES
INVENTOR
O. H. Watkins
By
Attorney

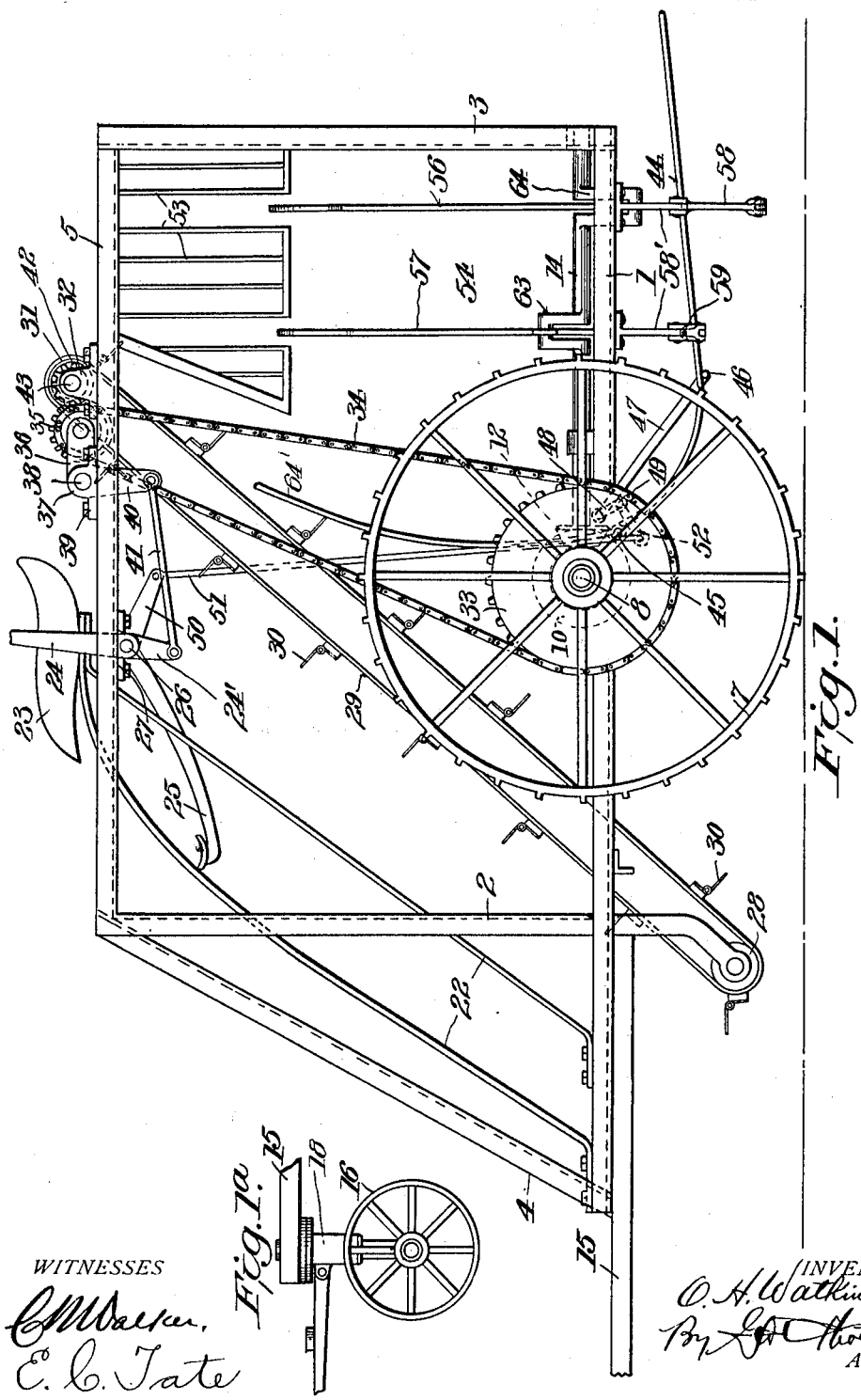

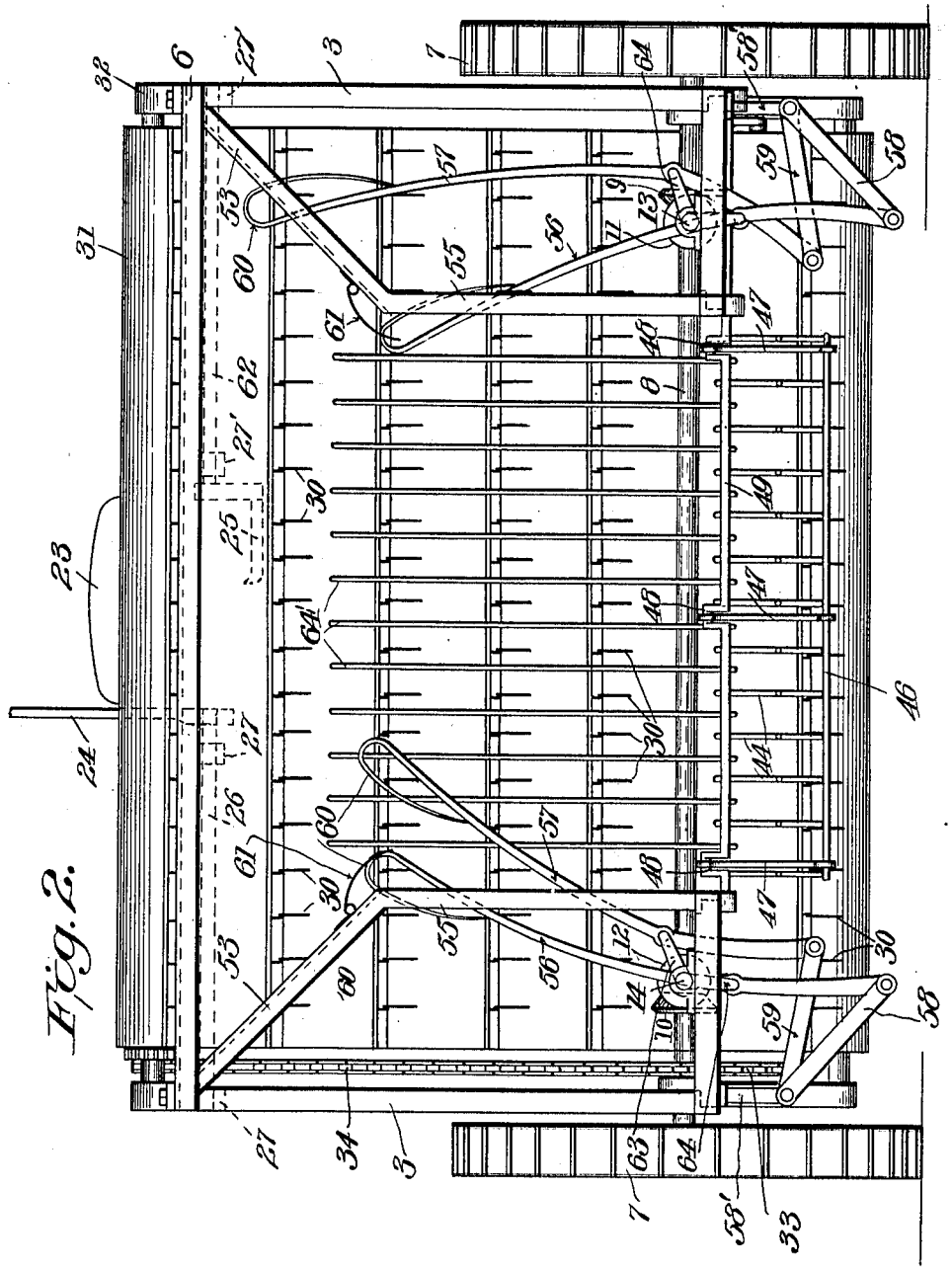

UNITED STATES PATENT OFFICE.

OWEN H. WATKINS, OF CORVALLIS, OREGON.

HAY-SHOCKER.

1,039,230.  Specification of Letters Patent.  Patented Sept. 24, 1912.

Application filed July 3, 1911. Serial No. 636,809.

*To all whom it may concern:*

Be it known that I, OWEN H. WATKINS, citizen of the United States, residing at Corvallis, in the county of Benton and State of Oregon, have invented certain new and useful Improvements in Hay-Shockers, of which the following is a specification.

This invention relates to hay shockers.

One object is to provide a hay shocker comprising means whereby the hay may be lifted from the ground and deposited in a shock receptacle and packed therein and subsequently discharged therefrom.

Another object resides in the provision of a comparatively simple, inexpensive, durable and efficient hay shocker embodying among other characteristics means whereby the conveyer of the machine may be thrown into and out of operation during transportation of the machine and whereby the hay may be packed in the machine without danger of clogging the conveyer.

With the above and other objects in view, the present invention consists in the construction and arrangement of parts hereinafter more fully described, illustrated in the accompanying drawings and particularly pointed out in the appended claims, it being understood that changes in the form, proportion, size and minor details may be made without departing from the spirit or sacrificing any of the advantages of the invention.

In the drawings:—Figure 1 is a side elevation of the invention. Fig. 1ª is a detached fragment of Fig. 1. Fig. 2 is a rear view. Fig. 3 is a front view of the front wheels of the machine. Fig. 4 is a detailed view of the packer arm crank shaft in operative connection with the drive shaft. Fig. 5 is a detailed view of the crank shaft which has operative connection with the supporting tines for the support of the latter. Fig. 6 is a detailed view of the crank arm that supports the transmitting sprocket of the conveyer mechanism.

Referring now more particularly to the accompanying drawings, the reference character 1 indicates the side sills of the frame of the machine having spaced front and rear uprights 2 and 3 respectively, said uprights on each side of the frame being connected by beams 5 with opposite uprights connected by beams 6.

The driving wheels of the machine are indicated at 7 and are mounted on the driving shaft 8 on which latter near each end are the beveled gear wheels 9 and 10 which are adapted to mesh with beveled gears 11 and 12, respectively, on the longitudinally directed crank shafts 13 and 14, respectively, designed for a purpose presently explained.

The frame hereinbefore described is provided with a forwardly projecting reach 15 to the forward end of which are secured the front wheels 16, there being an inclined brace 4 connecting the reach 15 and the front of the main frame. The front wheels 16 in addition to having their axis 19 rotatably mounted by means of the pintle 17 which extends through the reach 15 and the sleeve 18 secured to the clip-like member 21 and fitting over the axle 19 and pivoted at 20 to the axle, but by virtue of said pivot 20 the front axle may be tilted vertically in the direction of its length, the ears of the clip-like member 21 providing a guide for the axle 19 in its tilting movement. The result of this peculiar mounting is that if one wheel 16 strikes an obstruction that particular end of the axle 19 may become elevated without interfering with the running of the machine.

The character 22 indicates supporting members for the seat 23 preferably mounted slightly above the upper members 4 of the framework, there being hand and foot levers 24 and 25 fixed on the shafts 26 and 62 respectively, said shafts being mounted in brackets 27 and 27' respectively.

The lower ends of the front uprights 2 extend preferably below the sills 1 and have journaled in their lower extremities the roller 28 over which works the conveyer 29 provided with the spring fingers 30, there being a roller 31 journaled in the bearings 32 on the upper beams 4 and arranged farther toward the rear of the frame than the roller 28 so that the conveyer is disposed upon a rearward inclination.

In order to drive the conveyer there is mounted on the drive shaft 8 a sprocket 33 with which connects a drive chain 34 which passes over the sprocket wheel 35 journaled in the arm 36 of the double armed lever 37 pivoted at 38 in the bearing 39 and having its other arm 40 connected by the link 41 with the lower end of the crank arm 24', the sprocket wheel 35 being adapted to mesh with the sprocket 42 on the shaft 43 of the roller 31, whereby, upon forward movement of the machine, the conveyer is caused to travel to lift the hay from the ground upwardly and over the roller 31 and drop it down on to the supporting tines 44 pivotally mounted on the transverse shaft 45. These tines 44 are held normally in the position shown in Fig. 1 by means of the holding bar 46 to which latter the tines are rigidly connected which bar 46 has a plurality of links 47 connecting it with the cranks 48 of the crank shaft 49 journaled transversely of the machine adjacent the aforesaid transverse shaft 45.

After the hay has been packed on the tines 44 and it is desired to deposit the hay on the ground, it is only necessary to push the aforesaid foot lever 25 forwardly when the arm 50 on the end of shaft 62 will be lifted, which will lift the rod 51, pivotally connected to said arm 50, and to the arm 52 of the crank shaft 49, causing the latter to rock, and by virtue of the link connections 47 between said crank shaft 49 and the holding bar 46, the tines 44 will be lowered, thereby depositing the hay on the ground in the rear of the machine.

The frame of the machine is narrower at its rear than at its forward end and at the rear end of the frame is provided what may be termed a receptacle 54 whose bottom is formed by the tines 44, said receptacle having the inclined frame members 53, the front tine members 64' and the side members 55. The conveyer being wider than the receiving receptacle 54, there is an efficient delivery of hay to the receptacle, the stationary tines 64' preventing the material in the receptacle from clogging the conveyer.

While the hay is being placed upon the tines 44 it is packed thereon by the packer arms 56 and 57 pivoted to the links 58 and 59 respectively, the said links 58 and 59 being pivoted to supports 58' suspended from the frame of the machine. The packer arms are operated by the movement of the shafts 13 and 14 because of the mesh of their gears 11 and 12 with the respective gears 9 and 10 on the drive shaft 8. Thus, there is one set of packer arms at each side of the machine, each set preferably consisting of two arms which operate alternately with respect to each other, and each of which has its outer end preferably formed in to a loop 60. Each set of arms is operated by the respective crank shafts 13 and 14, they being connected to the respective crank bends 63 and 64 of the crank shafts 13 and 14. Thus the hay is well packed in the receptacle so that the latter may receive as much hay as possible, the springs 61 preventing the hay from being lifted by the packer arms out of the receptacle.

It will be seen from the foregoing that I provide a machine that will take up the hay from the ground and deliver it to the shock receptacle 54 where it may be confined until it is desired to discharge the same from the receptacle by manipulation of the lever 25 in the manner hereinbefore described. If it be desired to transport the machine with the receptacle 54 filled with hay and without delivering more hay to the receptacle, it is only necessary to manipulate the lever 24 to lift the sprocket 35 carried by the double armed lever 37 out of mesh with the sprocket 42 when the conveyer will be thrown out of operation.

What is claimed is:—

1. In a machine of the character described, a wheeled frame, a transverse shaft mounted in the frame, a shock receptacle in the rear of the frame whose bottom is formed by tines connected to said shaft, a crank shaft mounted transversely in the frame in spaced relation to the aforesaid shaft, a bar to hold said tines normally in operative position, connections between said bar and the crank bends of said crank shaft, a conveyer in front of the receptacle, means for driving the conveyer, means for throwing the conveyer into and out of operation, and means operatively connected to said crank shaft to operate the latter to tilt the tines to discharge the hay from the shock receptacle.

2. In a machine of the character described, a wheeled frame, a transverse shaft in the frame, a shock receptacle in the rear of the frame whose bottom is formed by tines connected at their inner ends to said shaft, a conveyer in front of the receptacle, means for driving the conveyer, means for throwing the conveyer into and out of operation, a crank shaft mounted transversely in the frame, a supporting bar to hold said tines normally in operative position, connections between said supporting bar and the crank bends of said crank shaft, a lever having operative connection with said crank shaft to operate the latter and in turn operate said holding bar so as to tilt the tines to discharge the hay from the receptacle, and packer arms operatively connected with the drive shaft of the machine for packing the material in the receptacle.

3. In a machine of the character described, a wheeled frame, a transverse shaft in the frame, a shock receptacle in the rear of the frame whose bottom is formed by tines connected at their inner ends to said shaft, a conveyer in front of the receptacle, means for driving the conveyer, means for throwing the conveyer into and out of operation, a crank shaft mounted transversely in the frame, a supporting bar to hold said tines normally in operative position, connections between said supporting bar and the crank bends of said crank shaft, a lever having operative connection with said crank shaft to operate the latter and in turn operate said holding bar so as to tilt the tines to discharge the hay from the receptacle, and packer arms operatively connected with the drive shaft of the machine for packing the material in the receptacle, the outer ends of said packer arms being looped, and means at the top of the shock receptacle to prevent the hay from being lifted out of the receptacle by the packer arms on the up-stroke of the latter.

In testimony whereof I affix my signature in presence of two witnesses.

OWEN H. WATKINS.

Witnesses:
F. B. READER,
T. L. READER.

Copies of this patent may be obtained for five cents each, by addressing the "Commissioner of Patents, Washington, D. C."